United States Patent [19]
Sponagel et al.

[11] Patent Number: 5,143,385
[45] Date of Patent: Sep. 1, 1992

[54] SHAFT SEAL

[75] Inventors: Stefan Sponagel, Rimbach; Waldemar Wachowitz, Hemsbach, both of Fed. Rep. of Germany

[73] Assignee: Firma Carl Freudenberg, Weinheim/Bergstr., Fed. Rep. of Germany

[21] Appl. No.: 830,509

[22] Filed: Jan. 31, 1992

Related U.S. Application Data

[63] Continuation of Ser. No. 660,969, Feb. 26, 1991, abandoned, which is a continuation of Ser. No. 400,577, Aug. 30, 1989, abandoned.

[30] Foreign Application Priority Data

Sep. 9, 1988 [DE] Fed. Rep. of Germany ....... 3830706

[51] Int. Cl.$^5$ .................................................. F16J 15/32
[52] U.S. Cl. ...................................... 277/134; 227/152; 227/153
[58] Field of Search ................ 277/134, 152, 153, 208, 277/210

[56] References Cited

U.S. PATENT DOCUMENTS

| | | | |
|---|---|---|---|
| 3,640,542 | 2/1972 | Mowat et al. | 277/134 |
| 3,672,690 | 6/1972 | Berens | 277/134 |
| 3,913,925 | 10/1975 | Gyory . | |
| 3,929,340 | 12/1975 | Peisker | 277/134 |
| 3,941,396 | 3/1976 | Bailey et al. | 277/134 |
| 4,387,902 | 6/1983 | Conover | 277/134 |
| 4,610,319 | 9/1986 | Kalsi | 277/134 |

FOREIGN PATENT DOCUMENTS

| | | | |
|---|---|---|---|
| 2453118 | 6/1975 | Fed. Rep. of Germany . | |
| 1058142 | 3/1954 | France | 277/134 |
| 499480 | 9/1938 | United Kingdom | 277/134 |
| 0499480 | 1/1939 | United Kingdom | 277/134 |
| 1382281 | 1/1975 | United Kingdom | 277/134 |

Primary Examiner—William A. Cuchlinski, Jr.
Assistant Examiner—Daniel G. DePumpo
Attorney, Agent, or Firm—Felfe & Lynch

[57] ABSTRACT

A shaft seal including a stiffening ring 1 and a lip ring 2 made of a polymeric material connected thereto. The lip ring 2 has a cylindrical surface 3 surrounding the shaft to be sealed about, i.e. shaft 5, in a very short distance and at least one retaining rib 4 projecting from said cylindrical surface towards the inside. The cylindrical surface 3, the retaining rib 4, and the shaft 5 surround capillary-active free spaces. The cylindrical surface rises above the retaining rib 4 on both sides in axial direction and the retaining rib 4 surrounds the shaft 5 on a sine-like course and continuously.

6 Claims, 2 Drawing Sheets

SHAFT SEAL

This application is a continuation of application Ser. No. 660,969, filed Feb. 26, 1991 now abandoned, which is a continuation of application Ser. No. 400,577, filed Aug. 30, 1989 now abandoned.

The invention relates to a shaft seal.

German DE-OS 24 53 118 discloses a shaft seal including several parallel extending retaining ribs which enclose an acute angle with the circumferential direction of the shaft to be sealed about. The angle is inclined such that during rotation of the shaft a conveying effect in a direction towards the space to be sealed is caused with respect to the free-flowing medium contained in the space. However, the conveying effect works only for a given sense of rotation of the shaft which is less than satisfactory. Also, the short service life of the sealing is not satisfactory at all.

It is an object of the invention to further develop a shaft seal of the aforementioned kind such that, independently of the sense of rotation, the sealing is good and the service life is significantly improved.

This object is achieved in accordance with the invention by means of a shaft seal defined by claim 1. The subclaims refer to preferred embodiments.

The cylindrical surface, the retaining rib and the shaft, in accordance with the invention, surround capillary-active free spaces which are defined with regard to their cross sections so small that the medium to be sealed is always latently present in the free spaces even during standstill of the shaft. Hence, during initial operation of the seal it is absolutely impossible that dry friction occurs at any point of the dynamic sealing zone and, consequently, there is a complete self-contained liquid film with the start of the rotating movement. The film is not attached to the opposing surfaces in any stable way but exposed to a rocking motion due to the sine-like shaped retaining rib. Even during a slightest possible relative motion of the opposing surfaces there is, from the beginning, a motional friction of the liquid components and hence, wear is correspondingly low. There are also no external disadvantageous influences affecting the friction, e.g a higher pressure at the space to be sealed. On the contrary, the components which are disposed upstream of the retaining rib in axial direction cause a reliable shielding. The radial extension thereof corresponds to at least the radial depth.

With an increasing number of rotations the liquid film is increasingly expanded in radial direction which simultaneously reduces the effects which the retaining rib can have with regard to the transportation of the liquid volume contained in the free spaces. In radial direction, the retaining rib has a height of 0.15 to 0.3 mm only; however, this low height suffices for a good circulation of the liquid volume in itself within the free spaces at an average rotational speed. Additionally, there is a certain residual transportation effect in axial direction which just suffices for a good sealing with regard to the space to be sealed. The intrusion of dust or oxygen, however, in the dynamic sealing zone is eliminated to the largest possible extent and it is believed that this is the main cause that the shaft seal in accordance with the invention ensures a significantly improved service life. In addition, the sealing effect achieved is independent of the sense of rotation of the shaft to be sealed. A universal use is possible without problems.

The retaining rib which sine-like surrounds the shaft to be sealed encloses with the circumferential direction a maximum angle of climb smaller than 20°, preferably smaller than 10°, and particularly smaller than 5°. In the latter case, the transportation effect is reduced to such an extent that, for example, in the sealing zone of a crankshaft there is an excellent sealing over a longer period of time even at high rotational speeds.

The retaining rib can have a profile defined by two intersecting inclined surfaces; the one inclined surface facing the space to be sealed together with the sealing axis (to enclose a liquid) is to enclose an angle which is more acute than the opposing inclined surface. If necessary, both inclined surfaces can join each other and can be rounded.

In accordance with the invention, a shaft seal comprises a stiffening ring and a lip ring made of a polymeric material connected thereto. The lip ring has a cylindrical surface surrounding a shaft to be sealed at a very short distance away therefrom and at least one retaining rib projecting from the cylindrical surface towards the inside. The cylindrical surface, the retaining rib and the shaft surround capillary-active free spaces. The cylindrical surface rises above the retaining rib on both sides in axial direction and the retaining rib surrounds the shaft sine-like and continuously.

For a better understanding of the invention, together with other and further objects thereof, reference is made to the following description, taken in connection with the accompanying drawings, and its scope will be pointed out in the appended claims.

Referring now to the drawings.

Figure 1:
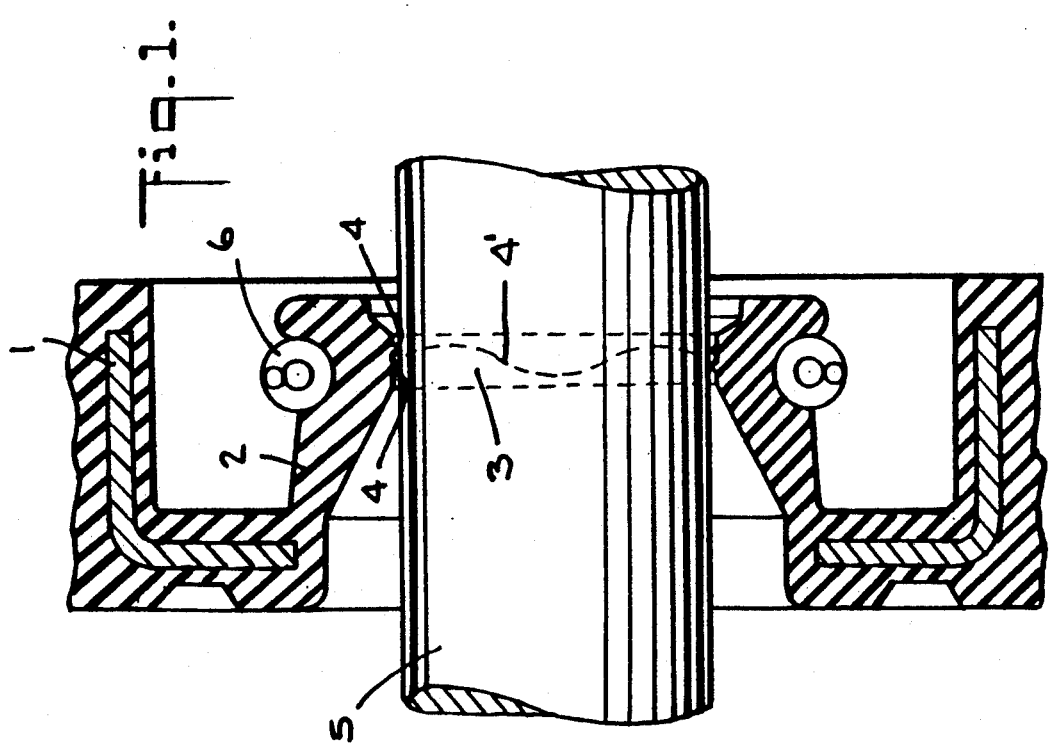
FIG. 1 is a fragmentary sectional view of the shaft seal in accordance with the invention.

The shaft seal as represented in FIG. 1 includes a stiffening ring 1 and a lip ring 2 made of a polymeric material, preferably rubber, connected thereto. However, the use of PTFE is also possible.

The lip ring 2 surrounds the shaft to be sealed about, namely, shaft 5, with cylindrical surface 3 on which a retaining rib portions 4 are disposed according to the embodiment of FIG. 1 to surround the shaft to be sealed about, sine-like and continuously. The retaining rib portions 4 defined in axial direction by inclined sharp-edged surfaces which intersect. In axial direction the cylindrical surface 3 of the lip ring 2 has an extension rising above the value of the retaining rib by 1.5 times the radial distance. In radial direction, the retaining rib portions 4 are calculated to be so low that the free spaces of cylindrical surface 3 and shaft 5 surrounded by said retaining rib, surround, in turn, capillary-active free spaces of the retaining rib during standstill of the shaft. The path of the free spaces of the cylindrical surface 3 and the shaft 5 surrounded by the retaining rib are indicated by path 4' on the shaft 5. They are already completely filled with medium to be sealed during standstill of the shaft. Hence, the formation of a completely self-contained liquid film at the dynamic sealing zone is already ensured in case of a minimum relative rotation of the shaft to be sealed about, i.e., shaft 5, with respect to the shaft seal. In the embodiment represented, the retaining rib has a radial height of merely 0.16 mm for a shaft diameter of 80 mm.

Figure 2:
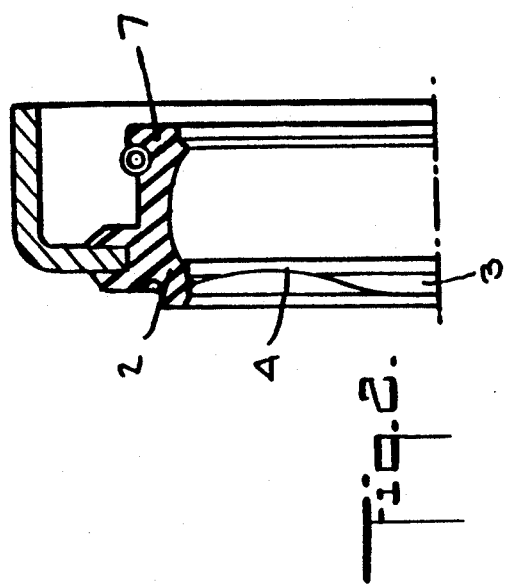
FIG. 2 is a fragmentary sectional view of a modified embodiment operating in both directions.

FIG. 2 relates to an embodiment for sealing two liquid-filled spaces with respect to each other. The sealing towards the space located on the right is carried out by a seal of conventional design whereas the sealing with respect to the liquid-filled space bordering on the left is carried out by a lip ring 2 in accordance with the invention. The sealing lip 2 is not exposed to stress caused by an annular spring, however, it is provided with a cylindrical surface 3 at the dynamic sealing zone; during standstill of the shaft, the cylindrical surface 3 surrounds the surface of the shaft to be sealed about at a constant distance and a continuous retaining rib 4 having a sinelike course projects radially toward the interior from said cylindrical surface 3. The rib 4 is in contact with the cylindrical surface of the shaft along its entire length. In this case, the cylindrical surface 3 has a larger axial extension than the retaining rib 4. The latter is extraordinarily well protected against external influences. In this case, the radial height of the retaining rib 4 is extremely low and amounts to 0.15 mm for a shaft diameter of 65 mm. The profile of retaining rib 4 is defined by two cone surfaces intersecting each other and joining each other rounded.

Figure 3:
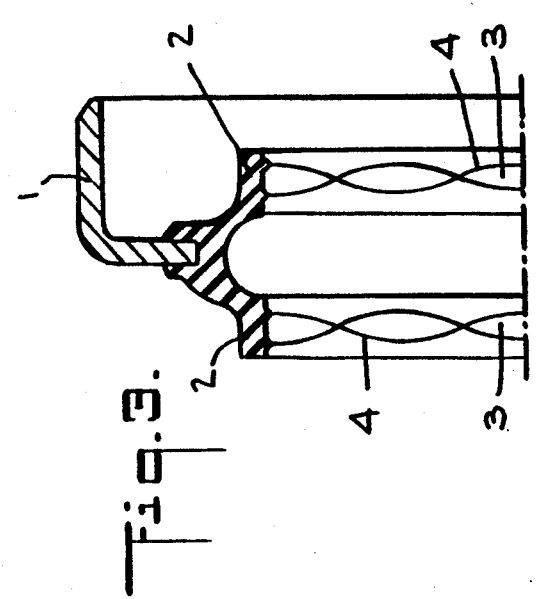
FIG. 3 is a fragmentary sectional view of an additional embodiment operating in both directions.
Figure 4:
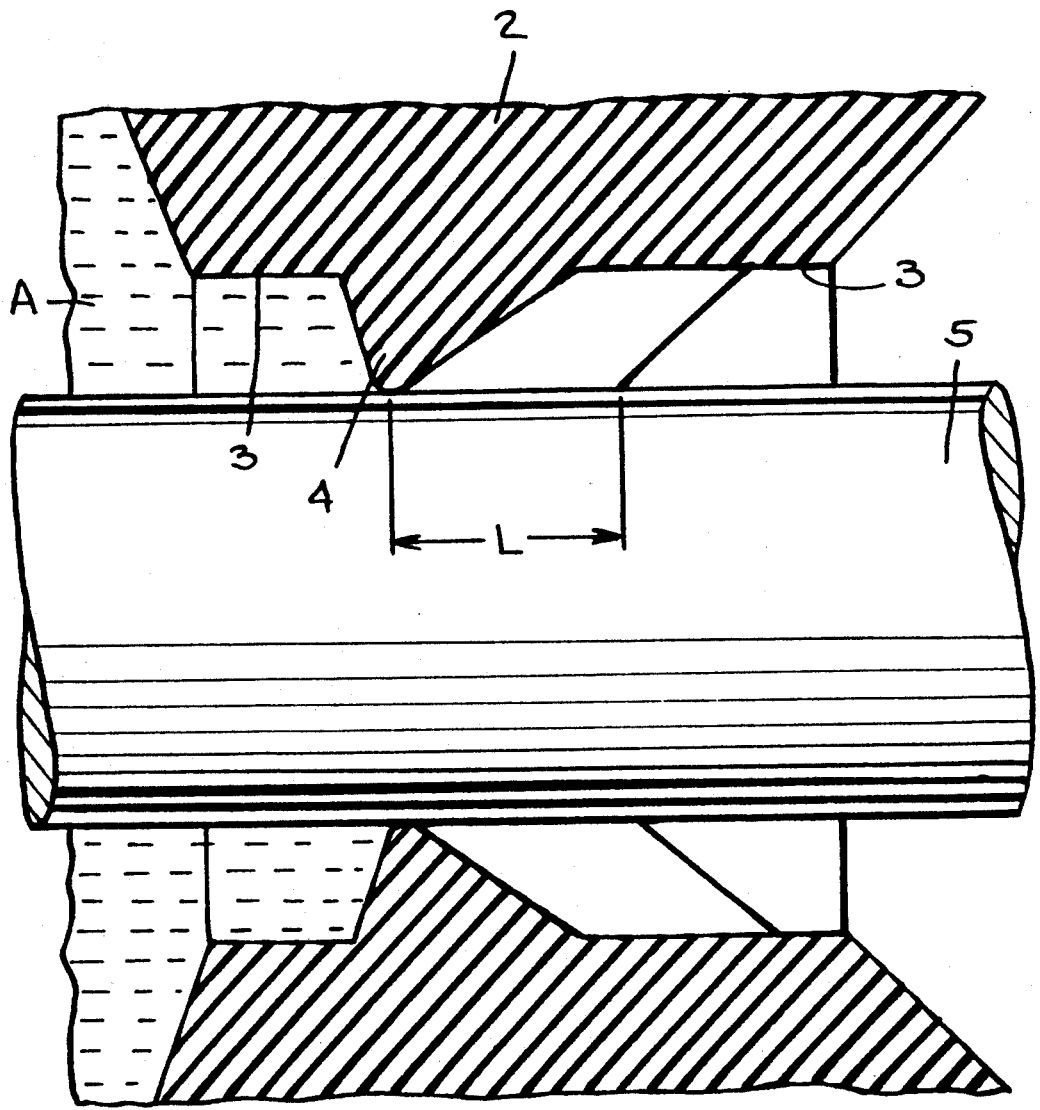
FIG. 4 is a fragmentary, sectional view of another embodiment of the shaft seal in accordance with the invention.

FIG. 3 relates to an embodiment designed to seal two liquid-filled spaces with respect to each other, similar to the embodiment according to FIG. 2. Correspondingly, two lip rings 2 are attached to the only available stiffening ring 1 by direct vulcanization; they join each other and are defined on the inside by cylindrical surfaces 3 on which two retaining ribs are disposed, respectively, projecting in radial direction to the inside. In axial direction, the retaining ribs are on both sides defined by inclined surfaces joining each other rounded. On each of the two cylindrical surfaces 3, the retaining ribs conform in configuration and profile; however, they are disposed in the circumferential direction relatively contorted to each other such that a valley of the one retaining rib is disposed upstream and in radial direction of the summit of the other retaining rib, respectively. This configuration is advantageous with regard to achieving a steady circulation of the liquid film which is disposed in the intermediate space under regular operating conditions.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A shaft seal comprising: a stiffening ring and a lip ring made of a polymeric material connected thereto; said lip ring having a cylindrical surface surrounding a shaft to be sealed at a very short distance away from said shaft and at least one retaining rib having a height of 0.15 to 0.3 mm and projecting from said cylindrical surface toward said shaft; the cylindrical surface, the retaining rib, and the shaft surrounding capillary-active free spaces, the capillary-active free spaces being completely filled with medium to be sealed during standstill of the shaft and forming a completely self-contained liquid film at a dynamic sealing zone, the cylindrical surface extending axially beyond each of said at least one retaining rib on both sides in axial direction and the retaining rib surrounding the shaft sine-like and continuously.

2. Shaft seal in accordance with claim 1, in which the maximum angle of climb between the retaining rib and the circumferential direction is smaller than 20°.

3. Shaft seal in accordance with claim 2, in which the maximum angle between the retaining rib and the circumferential direction is smaller than 10°.

4. Shaft seal in accordance with claim 3, in which the maximum angle between the retaining rib and the circumferential direction is smaller than 5°.

5. Shaft seal in accordance with claim 1, in which the retaining rib has a profile defined by two inclined surfaces intersecting each other and in which the inclined surface facing the space to be sealed encloses a more acute angle with the sealing axis than the opposing axis.

6. Shaft seal in accordance with claim 5, in which the inclined surfaces join each other and are rounded.

* * * * *